(12) United States Patent
Smith

(10) Patent No.: US 6,441,920 B1
(45) Date of Patent: Aug. 27, 2002

(54) SYSTEM AND METHOD FOR OUTPUT MANAGEMENT

(75) Inventor: David D. Smith, Londonderry, NH (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/246,646

(22) Filed: Feb. 8, 1999

Related U.S. Application Data

(63) Continuation-in-part of application No. 08/869,244, filed on Jun. 4, 1997.

(51) Int. Cl.$^7$ ................................................. G06F 3/12
(52) U.S. Cl. ........................... 358/1.2; 358/1.1; 358/1.9; 358/448
(58) Field of Search ........................... 358/1.1, 1.2, 1.9, 358/1.12, 1.13, 1.14, 1.15, 1.18, 444, 448, 518

(56) References Cited

U.S. PATENT DOCUMENTS 6,097,503 A * 8/2000 Felleman .................... 358/1.9

FOREIGN PATENT DOCUMENTS

| EP | 0767578 | 4/1997 |
|---|---|---|
| EP | 0843284 | 5/1998 |
| EP | 0961231 | 12/1999 |
| JP | 09102846 | 4/1997 |

OTHER PUBLICATIONS

U.S. patent application No. 09/089,861 filed Jun. 3, 1998, by Bloomquist et al.

* cited by examiner

*Primary Examiner*—Mark Wallerson
(74) *Attorney, Agent, or Firm*—Ira V. Heffen; Robert A. Sabourin

(57) ABSTRACT

An output manager that is included in a prepress workflow between a raster image processor and an output device generates a print production format file. The file is created by defining an output device and a press, and configuring a press profile in response to the output device and the press. The output manager receives a reduced resolution image, modifies the reduced resolution image responsive to the press profile, and stores the modified reduced resolution image in a print production file according to the CIP3 format.

26 Claims, 11 Drawing Sheets

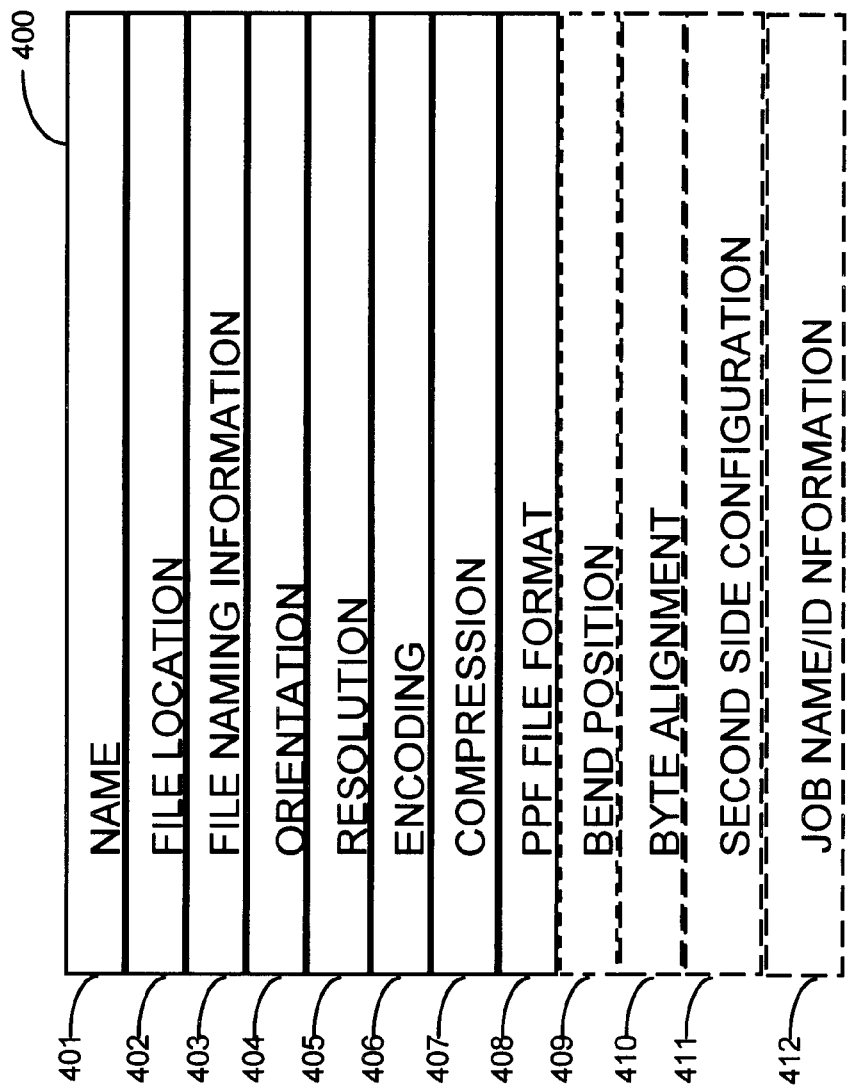
FIG. 6 - PRESS PROFILE

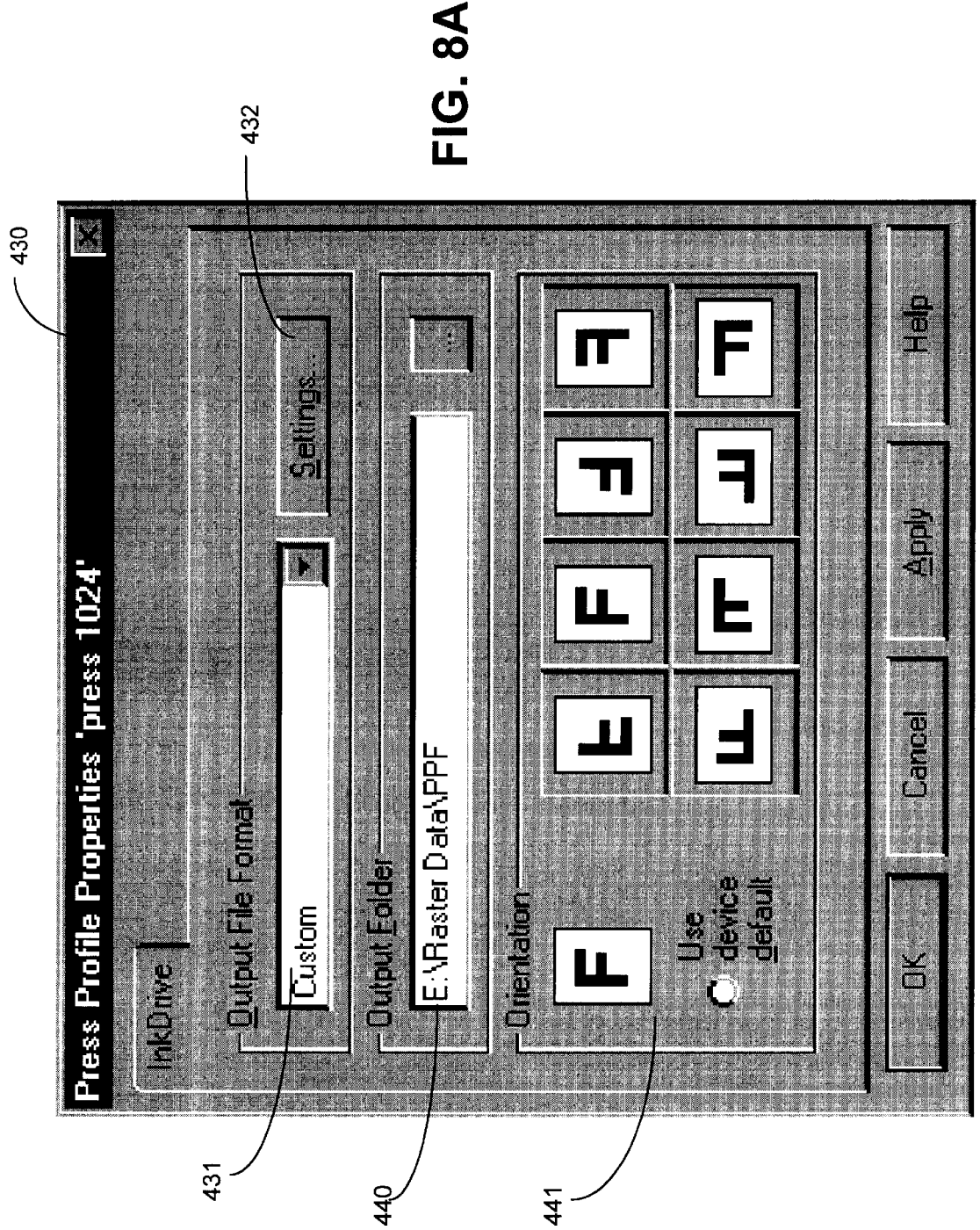

SYSTEM AND METHOD FOR OUTPUT MANAGEMENT

This application is a continuation-in-part of U.S. patent application Ser. No. 08/869,244, filed on Jun. 4, 1997.

TECHNICAL FIELD

The invention relates to electronic prepress and imagesetting systems. More particularly, the invention relates to a system and method managing output in an electronic prepress environment.

BACKGROUND INFORMATION

Printing presses use plates to print ink onto paper and other media. One method used for creating plates has been to expose photosensitive film with the matter to be printed. When the film is developed, the matter imaged on the film is imaged onto a photosensitive plate, sometimes referred to as "burning" a plate. After processing, the plate can be used to print the matter onto a medium. A printing project is referred to as a job. A job can include one or more sheets, where a sheet is the media to be printed on. A sheet can be printed on one or two sides.

In a black and white printing job, there is usually one plate that is used to print black ink. In a color printing job, a different plate is used for each color ink. Typically, a color job will use three colors of ink: cyan, magenta, and yellow. This is because a combination of cyan, magenta, and yellow can be used to make other colors. Often, in addition to cyan, magenta, and yellow, black ink is also used. An additional plate is then required to print the black ink. Occasionally, one or more colors will be printed separately as well, referred to as a "spot color." That color will also have its own plate.

To print on a press using a plate, the plate is installed on a press. The plate is generally held in place on the press by pair of clamps at opposite sides of the plate, referred to as a head clamp and a tail clamp. The plate is exposed to the appropriate color ink, and the inked plate is placed in contact with the media, such as a paper sheet, that is to be printed. Each image that is printed has a gripper edge. The gripper edge is the edge of a sheet (i.e. printed media) that is pulled through the press. A gripper edge marker is often explicitly included in an image as part of a job at the front end, for example with imposition software, such that the gripper edge marker is visible on the imaged plate. The gripper edge of a plate, which is the edge with the gripper edge marker, is attached to the press with the head clamp. By explicitly imaging the gripper edge marker onto the plate, the front end software ensures that there is sufficient distance between the head clamp and the image content so that the image on the plate can be printed.

Electronic prepress systems have used an imagesetter to receive raster data for imaging onto photosensitive film. The film is then used to create a plate. The imagesetter exposes the photosensitive film pixel by pixel, for instance, by scanning a laser across and down a piece of film. Generally, the laser is scanned more quickly across the film in one direction, referred to as the fast scan direction, and then is moved more slowly down the film, referred to as the slow scan direction. Electronics controls the laser to expose, or refrain from exposing, each pixel in the raster data in a precise and repeatable manner. Recently, platesetters also have been used to create plates directly from raster data without the use of film. Imagesetters, platesetters and other output devices for printing are also referred to generally as print engines or writing engines.

Print engines typically have been served by a dedicated raster image processor (RIP) connected between the print engine and a "front end" computer running imaging application software such as Quark Express™ offered by Quark, Inc. of Denver, Colo. and Adobe Pagemaker™ by Adobe Systems Inc. of Mountain View, Calif. Exemplary front end computers run on operating systems such as Windows NT™, MacOS™ and UNIX™. In a typical configuration, a Macintosh™ front end is connected to a RIP which is coupled with an imagesetter. The RIP interprets the graphic information transmitted to it by the front end computer, and converts the graphic information into raster data that can be imaged by the print engine. The raster data produced by the RIP is configured to match required parameters of both the imagesetter and the media. The imagesetter parameters include imaging resolution, processing speed and specific printing capabilities. The media parameters include the length, width and thickness of the media, as well as the chemical makeup of the photosensitive layer.

Typically, the imaging application software provides output in the format of a page description language (PDL) such as Postscript™ and PDF™ offered by Adobe Systems of Mountain View, Calif. Page description languages describe images using descriptions of the objects contained in the page. Use of page description languages allows pages to be described in a way that can be interpreted appropriately for imaging at various sizes and resolutions. PDL code is generally significantly smaller in data size than the raster data that results from interpreting the PDL code. Use of a page description language therefore allows for faster file transfer. Also, page description languages are machine-independent so that any print engine or other device which understands the PDL can produce an image therefrom.

When PDL image data is received by the RIP, operations performed by the RIP, such as using fonts to lay out text and color processing to create raster data for each color, typically results in one or more raster data bit maps. The raster data produced by the RIP is binary, meaning that each pixel is either on or off. The raster data for each of the colors in a color image is referred to as a color separation. A separation describes a single color plane, such as cyan, magenta, yellow, black, or a spot color.

Each color separation is transferred from the RIP to the output device over a high speed interface. This has historically been a parallel data transfer interface that provides a data transfer rate sufficient to keep the output device operating at a desired operating speed. Typically, the process of RIP processing data to prepare bit map image files for transfer to the output device has been slower than the imaging speed of the output devices. The slower RIP processing speed sometimes causes the output device to remain idle while waiting for a RIP to prepare the next bit map image file. The print engine is generally an expensive capital investment, so full time utilization of the print engine is desirable. Keeping the print engine busy is therefore a goal of modern electronic prepress system design.

The use of a RIP multiplexer (MUX), for example the MULTISTAR® offered by Agfa Corporation of Wilmington, Mass., offers the electronic prepress industry some improvement in data throughput, and associated cost savings, by functioning as a data buffer between one or more RIPs and a print engine. Cost savings and improved efficiency have been realized by either RIP processing an image with a first RIP while transferring a previously RIP processed image to the output device or by storing RIP processed raster data for transfer to the output device at an appropriate time after RIP processing. This multiplexer more fully utilizes the output device, and therefore provides increased throughput.

Typically, for prior art electronic prepress systems, a specific output device configuration had to be connected to the RIP before a job could be processed. For example, a print job requiring that a particular type of imagesetter be used for an output device, or that a particular media type or size be loaded onto the output device, could not be RIP processed into raster data if the particular output device connected to the RIP did not meet the job requirements. Improper output device configuration caused delay or, more frequently, required that a user take some action to physically change the output device connected to the RIP in order to continue processing and outputting image files. Since the electronic and imagesetting systems of the prior art were not only device dependent but media dependent as well, the queuing of rasterized print jobs for different media or output devices was not possible. Thus, the choice of the output device and print media proved to be a considerable hindrance in productivity.

RIP processing speed has improved so that the RIP is no longer a bottleneck in the pre-press workflow of single page printing jobs. As RIP processing speed has increased, however, so has the demands of output devices. Recent use of larger format imagesetters and platesetters allows multi-page press size images in film or plate, referred to as "flats," to be produced that contain four, eight, or more pages in each image that are printed on one sheet of paper. These output devices also have been driven by a dedicated RIP or MUX. Because multi-page flats are complex, the RIP is often a bottleneck in creating these multi-page press format films and plates. The PDL code that must be interpreted to image multiple page flats is very complex. RIP processing time for complex images can require several multiples of the imaging time.

SUMMARY OF THE INVENTION

The invention relates to an output manager, also referred to as a print drive, which is between one or more raster image processors and one or more output devices in the prepress workflow. The output manager receives, stores, and transmits raster data of an image processed by the RIP. In one embodiment, the output manager manages both a high resolution image that is to be transmitted to an output device, and a related low resolution image that is made available to a press. The press uses the low resolution image to adjust the ink key settings and other image-related parameters.

In general, in one aspect, the invention relates to a method for including a reduced resolution continuous tone image in a print production format file. The method includes defining an output device, defining a press, and configuring a press profile in response to the output device and the press. The method also includes receiving a reduced resolution image, modifying the reduced resolution image responsive to the press profile, and storing the modified reduced resolution image in a print production file. In one embodiment, the print production file follows the CIP3 print production file format.

In one embodiment, the modifying step comprises converting the reduced resolution image to another resolution responsive to the press profile. In another embodiment, the modifying step comprises encoding the reduced resolution image responsive to the press profile. In another embodiment, the modifying step includes compressing the reduced resolution image responsive to the press profile. In another embodiment, the receiving step comprises receiving by an output manager a high resolution image and a reduced resolution image. In another embodiment, the method further includes providing the stored print production file to a CIP3 consumer application. In another embodiment, the press profile has a press profile name, an orientation, a resolution, file name information, a compression setting, an encoding setting, and a print production file format. In another embodiment, the press profile also includes job name and identifier information. In another embodiment, the press profile is received once for each imagesetter/press combination. In another embodiment, the high resolution image and the reduced resolution image are generated by a raster image processor while the image is processed by the raster image processor.

In general, in another aspect, the invention relates to a system for including a reduced resolution continuous tone image in a print production format file. The system includes an input for configuring a press profile, a receiver for receiving a reduced resolution image, a processor for modifying the reduced resolution image responsive to the press profile, and a data store for storing the modified reduced resolution image in a print production file according to CIP3 format. In one embodiment, the input is also used to associate the press profile with a job. In another embodiment, the processor includes a converter for converting the reduced resolution image to another resolution responsive to the press profile. In another embodiment, the processor includes an encoder for encoding the reduced resolution image responsive to the press profile. In another embodiment, the processor includes a compressor for compressing the reduced resolution image responsive to the press profile. In another embodiment, the system is an output manager. In another embodiment, the system includes a transmitter for providing the print production file to a CIP3 consumer application. In another embodiment the press profile has a press profile name, an orientation, a resolution, file naming information, a compression setting, an encoding setting, and a print production file format. In another embodiment, the press profile also includes job name and identifier information. In another embodiment, the input receives the press profile once for each imagesetter/press combination. In another embodiment, the high resolution image and the reduced resolution image are generated by a raster image processor when the image is processed by the raster image processor.

In another aspect, a system includes a memory storing a press profile, the press profile includes a file location, and orientation, a resolution, file name information, a compression type, and encoding type, and a print production file format. In one embodiment, the press profile includes one or more of the following parameters: a bend position, a second side configuration, an image byte alignment, and job name and identifier information.

The foregoing and other objects, aspects, features, and advantages of the invention will become more apparent from the following description, figures and claims.

BRIEF DESCRIPTION OF THE DRAWINGS

In the drawings, like reference characters refer to the same parts throughout the different views. Also, the drawings are not necessarily to scale, emphasis instead being placed upon illustrating the principles of the invention.

FIG. 6 is a block diagram of an embodiment a press profile;

FIGS. 8A and 8B are an example of a user interface useful for the creation of a press profile;

DETAILED DESCRIPTION OF THE PREFERRED EMBODIMENTS

Figure 1:
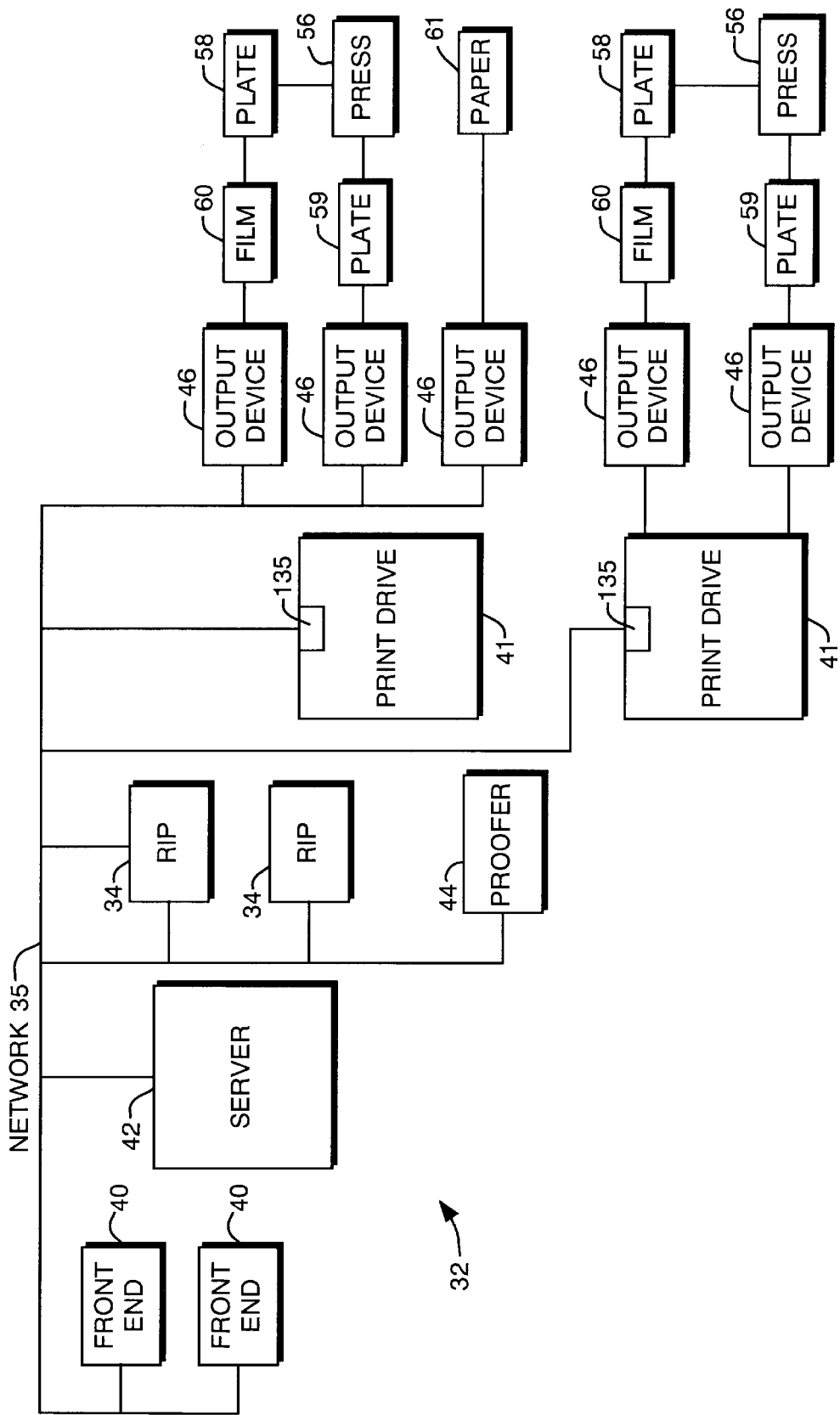
FIG. 1 is a block diagram of an embodiment of a prepress imaging system according to the present invention.

Referring to FIG. 1, a prepress system 32 includes one or more computers that are referred to as front ends 40. The front ends 40 are connected to computer network 35. The front ends 40 are used for system configuration, as well as for creating, editing, or otherwise processing image data. Both color and black and white images are prepared on the front ends 40 for processing by the prepress system 32 and eventual image reproduction by a printing press 56 using a printing plate 58. The front ends 40 are typically commercially available computers running on operating systems such as Windows NT™, Mac OS™, or UNIX™ or the like. The front ends 40 have imaging application software such as the commercially available Quark Express™ (from Quark, Inc.) and Adobe PageMaker™ (from Adobe Systems, Inc.), or any other similar software. The front ends 40 may also have imposition software used to lay out pages within an image, such as Preps™, available from ScenicSoft of Lynnwood, Wash., or any other such impositioning software. Impositioning software positions one or more pages within an image, so that multiple pages are included in a single image. Having multiple pages imaged on a single plate increases productivity, because multiple pages are printed at the same time. The imaging application software and the imposition software both produce images coded in a page description language. The front ends 40 can output images coded in a page description language directly to one or more raster image processors 34 via the network 35. The front ends 40 can also provide images to one or more image servers 42, or to a proofer 44 via the network 35.

The network 35 can be any of the various types of commercially available computer networks, but must be of sufficient capacity to handle the traffic generated by the prepress system. In one embodiment, the network is a Fast Ethernet network, including a 100baseT Hub and appropriate connections between the networked components and the hub.

In one embodiment, an image server 42 receives and stores images from the front end 40. Image server 42 can queue jobs for immediate transmission to an available RIP 34. Image server 42 can also store images from the front end 40 for later processing by RIP 34. Image server 42 helps improve workflow efficiency by allowing front end users to output their jobs even if the RIPs 34 are busy. By queuing jobs for RIPs 34 on servers 42, the RIPs 34 can be kept continuously busy.

The RIPs 34 may be software RIPs operating on a computer system, which may be one of the front ends 40, or other computer systems. The RIPs may be software RIPs such as the Agfa Viper™ software RIP and the Agfa Taipan™ software RIP, or hardware RIPs such as the AgfaStar™ hardware RIP, each of the above RIPs being commercially available from Agfa Corporation in Wilmington, Mass. Each RIP 34 has a software and/or hardware RIP module for RIP functions such as screening, trapping, imposition, page or image combination, color separation and color management of image data.

The RIPs 34 each include a bi-directional network interface module 135 (see FIG. 3) over which PDL files are received from front ends 40 or the image servers 42. Each RIP 34 thus appears on the network and can be accessed by any front end 40 or any image server 42 on the network 35. The network interface module 135 also serves as an output interface for communication of the RIP 34 through the network 35. In another embodiment, separate hardwired input and output connections are used between each RIP 34 and an associated output manager 41.

An output manager 41, also referred to as a print drive, includes a plurality of software modules operating on a standard computer platform configured for efficient output manager functions. Embodiments of an output manager are described in U.S. patent application Ser. Nos. 08/869,244, and 09/089,861, which are incorporated herein by reference. The output manager hardware may also include a number of interface boards or modules including a fast network interface and hardware connection to an output device 46. Output manager 41 receives raster data from the RIPs 34 which it can either store or immediately send to an output device 46, depending upon instructions programmed by the operator. Output manager 41 may be connected to the RIPs 34 via the network 35, or may have individual connections to the RIPs. The output manager 41 may be directly connected to the output devices 46, as shown in the embodiment of FIG. 1, or it may connect with the output devices 46 via network 35, or via other connections. The output devices 46 include imagesetters, platesetters, printers, plotters and other devices which accept and/or output raster data.

An output device 46 can be an imagesetter that images onto photosensitive film 60 or paper 61. The photosensitive film 60 is used to make at least one plate 58. A plate 58 is used on press 56 to print one color separation of an image. On a black and white image, only one color, black, may be necessary. For a color image, generally at least the three colors, cyan, magenta, and yellow, and often a fourth color, black, are used. One or more "spot color," which refers to an additional color, may be used as well. The imagesetter images the raster data for each color separation onto film, and the film is used to make a plate 58. The plates are then used on the press to print high quality printed material, often in large quantities. Examples of imagesetters are the Selectset Avantra®, the SelectSet® 7000, and the AccuSet® Plus imagesetters, all available from Agfa Corporation of Wilmington, Mass.

An output device 46 can also be a direct-to-plate or computer-to-plate device such as a platesetter which images directly onto a plate 59, without the use of film 60. By use of a platesetter 64, the step of creating a plate 58 by using film 60 is eliminated, improving workflow and eliminating the costs involved in making a film. Examples of platesetters are the Agfa Galileo™ platesetter and the Agfa Polaris 100™ digital platesetting system, available from Agfa Corporation of Wilmington, Mass.

As described above, imagesetters and platesetters generally image on sensitive media using a laser or other energy source. The imagesetter scans the laser across the media in what is referred to as the fast scan direction and moves the laser down the media in what is referred to as the slow scan direction after each scanline has been imaged. A bitmap image generated by a RIP 34 is a compilation of scanlines of data, with each scanline containing a line of pixels in the fast scan direction. Generally, the length of the image in the slow scan direction is the number of scanlines. The RIP therefore generates bitmaps that are oriented such that the RIP or the output manager, when transmitting an image to the imagesetter, can first transmit the first fast scan scanlines of the image, thus allowing the imagesetter to begin imaging the first scanlines of data, even as later scanlines are still being transmitted.

A consequence of the RIP 34 generating images so that they can be transmitted in fast scan scanlines by the imagesetter is that an image generated for one imagesetter may be different than the same image generated with the same imaging parameters for a different imagesetter. Different imagesetters have different aspect ratios. For example, the Agfa Galileo platesetter measures approximately 32.8" in the fast scan direction and 44" in the slow scan direction. The Agfa Avantra 44 measures approximately 44.5" in the fast scan direction and 36" in the slow scan direction. A 30"×40" image that is processed by a RIP for output on a Galileo will be processed so that the longer edge will be imaged in the slow scan direction. If the RIP processed the same image for the Avantra 44, the image would be oriented such that the longer edge will be imaged in the fast scan direction. Thus, the same image that is processed for two different imagesetters can be oriented in different directions.

Figure 2:
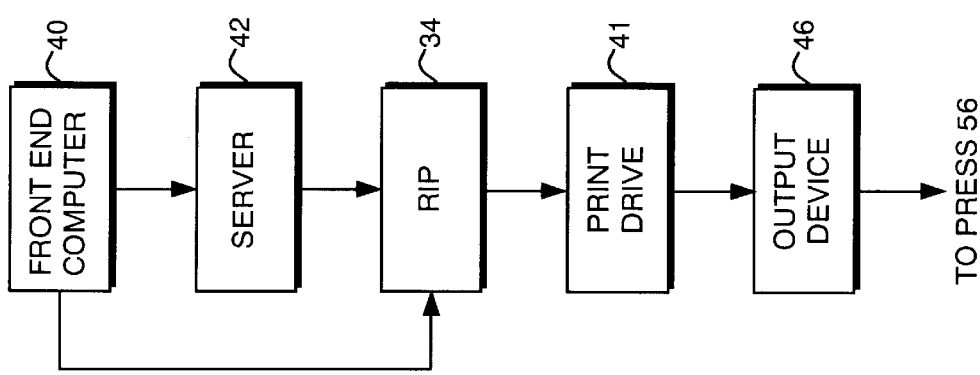
FIG. 2 is an embodiment of a flowchart of the workflow of a job in the prepress imaging system of FIG. 1.

Referring to FIG. 2, the work flow through the system of FIG. 1 begins with the front end 40. The image is designed using an imaging application such as PageMaker™. An exemplary image includes both text and graphics, and the image may be impositioned on the front end 40, meaning that a number of pages are placed appropriately within a flat. The front end 40 may queue the image for processing by sending the job to the image server 42. Alternatively, the front end 40 may output the job directly to a RIP 34. Use of an image server 42 provides the system operator with more constant utilization of the front end 40 and the RIP 34 because neither the front end 40 nor the RIP 34 wait for the other. The image is transmitted to the RIP 34 by either the front end 40 or the image server 42. The image is then processed by the RIP 34. The RIP 34 outputs raster data to the output manager 41 which, in turn, stores the raster data until it is ready to be imaged onto an output device 46.

Note that numerous varied configurations of a prepress imaging system similar to that shown in FIG. 1 can be utilized to implement the principles of the current invention. For instance, the system could include any combination of the following: one or more front end computers 40; one or more servers 42; one or more RIPs 34; one or more proofers 44; one or more output managers 41; and one or more output devices 46. Any number of printing presses 56 could be thereafter connect to the prepress imaging system.

The press 56 is included in the flowchart of FIG. 2 for completeness of the image origination to printing process workflow, however, the press 56 is actually not part of the prepress imaging system. The primary function of the prepress system is to efficiently produce plates for use in the press 56. As is described below, information generated during the prepress workflow can be useful for the press printing.

Although the preferred embodiment calls for the output device 46 to be a print engine, the output device can be any destination device or application which accepts raster data, such as a hard drive for storage. A print engine output device 46 may render an image onto any known media such as paper, film or plate. Although frequently a RIP 34, output manager 41 and output device 46 will be locally situated; while the press 56, front end 40 and server 42 are remotely situated; the various components of the prepress imaging system can generally be either locally or remotely situated, subject to variables such as cable signal loss limitations, etc. Moreover, image data used throughout the prepress imaging system 32 can generally be stored in any component accessible over the network, i.e. the front end 40, the server 42 or the output manager 34.

Figure 3:
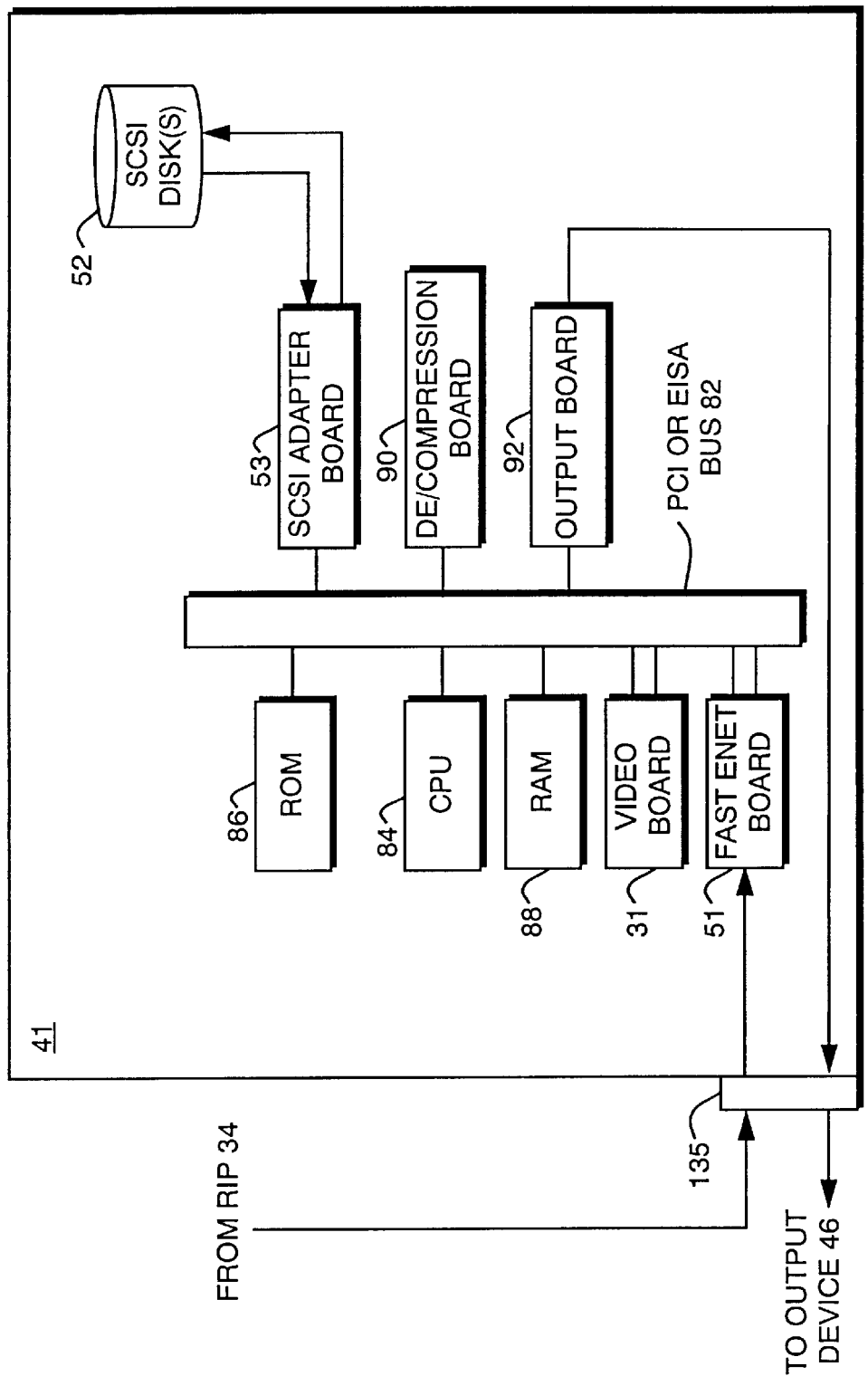
FIG. 3 is a block diagram of an embodiment of the output manager of the prepress imaging system of FIG. 1.

Referring to FIG. 3, one embodiment of an output manager 41 includes at least one CPU 84 connected to a multiple connection system such as a PCI or EISA bus 82. Other bus configurations are also suitable. In one embodiment CPU 84 is an Intel Pentium™ processor. Many other commercially available processors are also suitable. Output manager 41 also includes ROM 86, RAM 88 and a fast Ethernet board 51. Enough RAM 88 is necessary to support the operating system and to process the raster data sent and received by the output manager 41. A SCSI adapter board 53 is connected to the bus 82 and at least one SCSI storage device 52, e.g. a hard disk. Output manager 41 includes a compression/decompression board 90 for compressing and decompressing files, as well as an engine interface or output board 92 for direct connection to an output device 46. The network interface module or output manager interface terminal 135 is the hardware interface between the output manager 41 and the network 35.

Figure 4:
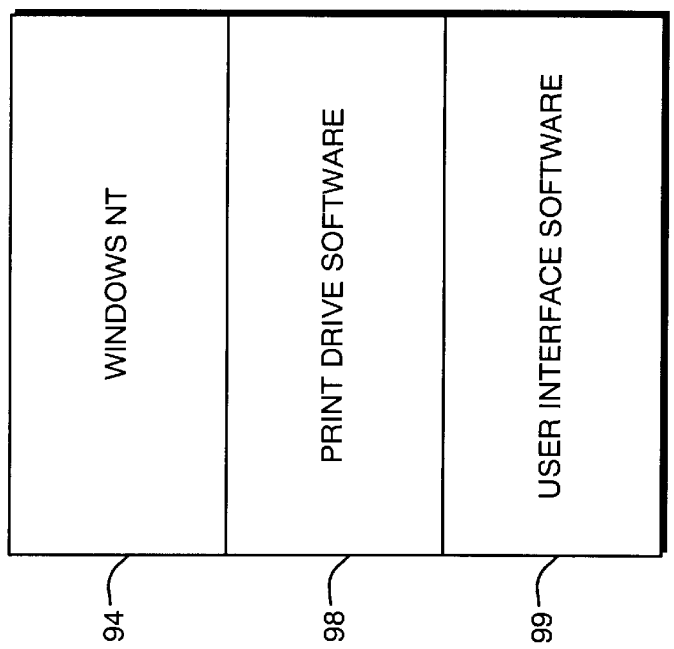
FIG. 4 is a block diagram of an embodiment of the software for the output manager of the prepress imaging system of FIG. 1.

Referring to FIG. 4, in one embodiment the output manager 41 uses the Microsoft Windows NT™ operating system 94. The output manager software 98 runs in coordination with the operating system 94 to interface with the hardware components of the system. The output manager software operates as a set of Windows NT™ services which are configured, started, and stopped by an NT service manager. User interface software 99 directs the activities of the output manager 41 using output manager software 98.

For example, the user interface software 99 allows the user to perform local setup and configuration whereby the user configures the output manager 41 for an output device 46 to which it is connected. The user interface software 99 is also used to control the work flow and the raster data processing features. The user interface software 99 runs on the output manager 41 and is also capable of running on workstations such as front ends 40 or other computer systems connected either locally or remotely to the network 35. Remote users of the user interface software 99 have access to the same control features as users of the user interface software 99 running locally on an output manager 41.

Figure 5A:
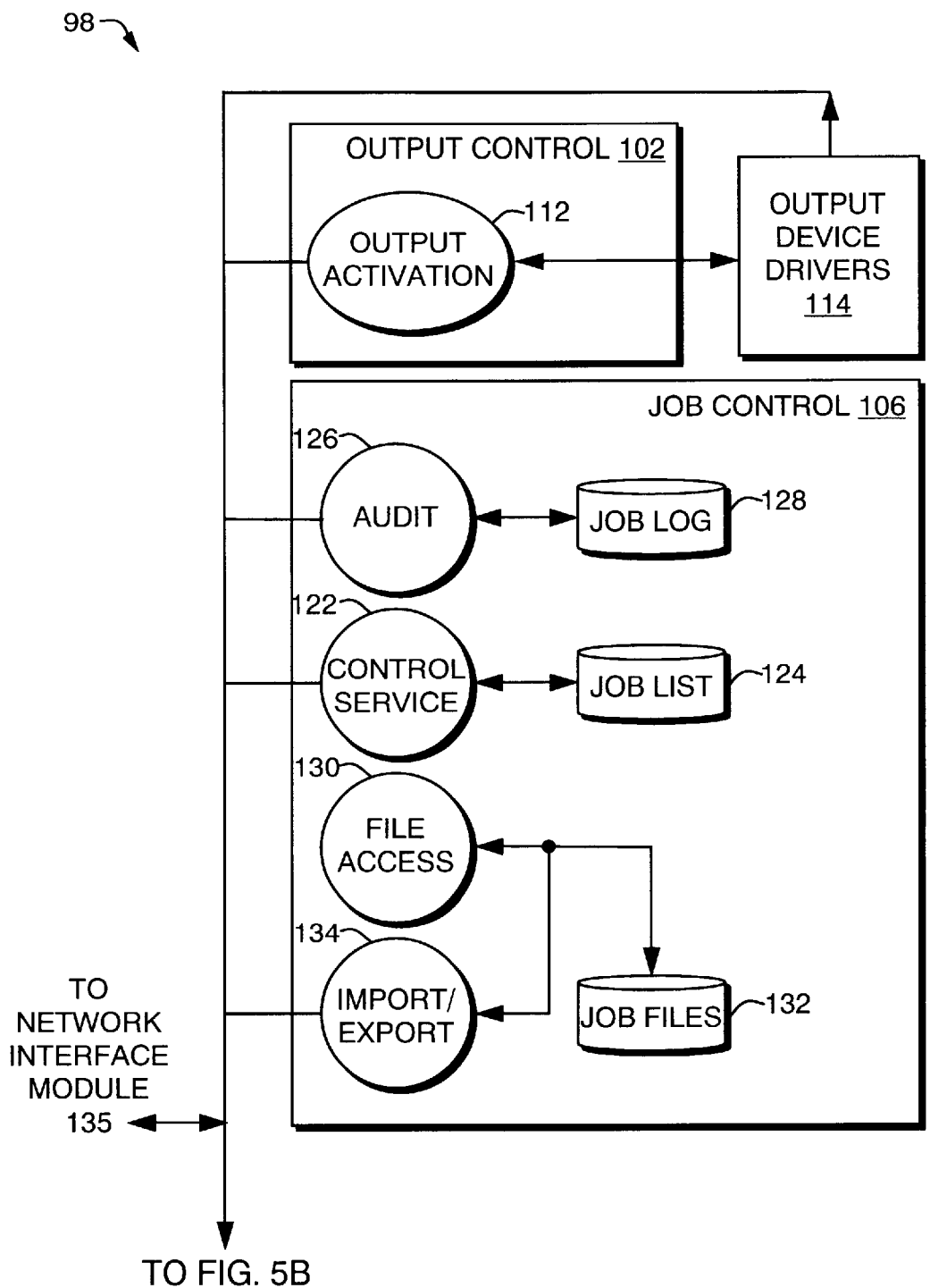
FIGS. 5A and 5B are a block diagram of an embodiment of the functional elements of the output manager software of FIG. 4.
Figure 5B:
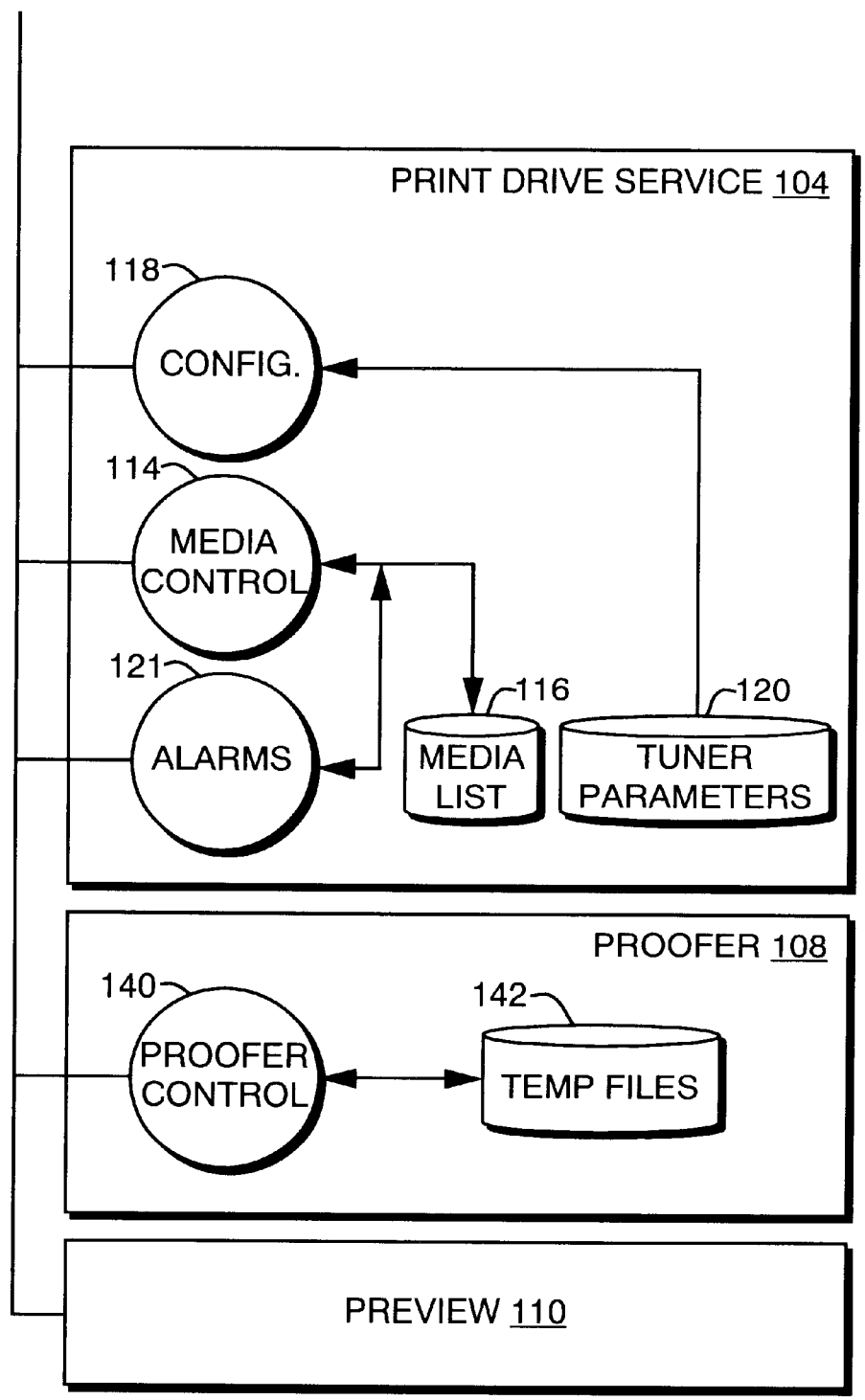

In more detail, and referring to FIGS. 5A and 5B, the output manager software 98 includes an output control system 102. The output control system 102 includes an output control interface subsystem or output activation system 112. The output control interface subsystem 112 communicates with output device drivers 114 to transmit raster data to an output device 46. The output control system 102 can reactivate the device drivers 114 in the case of error.

The output manager software 98 also includes an output manager service system 104. The output manager service system 104 includes a media control subsystem 114. The media control system 114 provides an interface to the media list 116, which contains information about each type of media available to the output manager 41. Information about the media types supported on the installed output devices 46 are made available to a RIP 34 via this subsystem 114. Initial mapping of media types is done when an output device 46 is installed and may be changed at any time through the user interface software 99.

The output manager software 98 includes a configuration subsystem 118. The configuration subsystem 118 works with the user interface software 99 to configure the output manager software 98. In one embodiment, configuration parameters 120 are stored in the SOFTWARE section of the NT registry and the configuration subsystem 118 provides an interface to this data. Alarms subsection 121 provides alarms if errors are encountered. Alarms can sound on the output manager 41 or on computers 40 connected to the output manager 41 via the user interface software 99.

Job control system 106 receives, stores, and initiates output of raster data. The job control service 122 provides access to the data and functions associated with a job list 124 which is a list of all raster data contained in the system 32. The raster data is organized by image and color separations, so that the job list 124 holds the location information and status for all raster data associated with a job. All files for a job are written to a data storage area of the output manager 41 or in other accessible memory elsewhere in the system 32, such as in the front end 40 or the server 42. In one embodiment, each color separation is stored in its own job file in TIFF format. All color separations and their descriptive names are stored in the job list 124. These files are accessed through the job control service 122. File operations supported by the job control service 122 include addition of new jobs, deletion of job files, replacement of job files, and marking color separations as "imagable" and "not imagable."

The job control service 122 also includes a job picker. The job picker determines how jobs on the job list are chosen for output to the currently connected print engine 46. The job picker scans the job list 124 for all jobs that can be output at that time. The determination of which jobs to output is based upon how the job picker is configured. For example, with regard to media, the job picker can be configured to use the media type and size indicated by the RIP 34 when it sent the job, use the media type indicated by the RIP 34 but image on any size media (as long as it is large enough for the image), or to ignore the media type and size specified by the RIP 34. The job picker can also be configured to conserve media, also referred to as media optimization. The job picker can be configured to always optimize using spindles when no media size is used, meaning that a choice of media will be made to use the smallest media possible for an image. Alternatively, the job picker can be configured to use ganging on loaded media, meaning that jobs for the same media will be imaged immediately after each other, to reduce inter-image media waste. Ganging will give priority to images that can use the media that is already loaded on the machine. The job picker can also be configured not to try to conserve media, or to use the media optimization specified by a particular print job. The job picker can also be configured for a number of jobs that can precede the next job in the list so that they can be imaged on the same media. When that limit is exceeded, a change media command is sent to the output device 46 so the next job in the list 124 can be run.

The job audit log subsystem 126 provides access to the job audit log 128. The job audit log 128 is used to record transactional job oriented events occurring on any part of the output manager system 32. The job audit log 128 persists even after a job is deleted. The persistence time of the job audit log files 128 is configurable.

Job files are stored and accessed using the file access subsystem 130. In one embodiment, job raster data is stored in TIFF format, and the raster data for each color separation is stored in a separate file in the jobs data store 132. All information regarding a job is stored either in the job list 124 or in the job files 132. Typical job list information is that which relates to the job as a whole, such as priority, media type, and processing options. Typical job file information includes when and where to print a job, how many copies to print, how many images per flat will be printed, etc. The job list and job file information is used by the job control service 122 to schedule a job for imaging.

The import/export subsystem 134 provides a mechanism for files to be imported and exported from or to other file systems connected to the network 35. This mechanism allows for the archiving of files in the job list 124. Files can be copied to any local or networked disk device. Import allows a new job to be created by importing the raster data, and creating, via the job control service 122, a directory in which to copy the job files. The job control service 122 adds the copied files to the job list 124.

The output manager software 98 can also include such other functionality as proofer system 108, which includes proofer control 140 to convert raster data files for imaging on a proofer 44. Temporary proofer files are stored within a temporary store 142.

The preview system 110 provides access to the jobs in the job list 124 for user review on a computer monitor. Jobs are accessed via job control service 122. Raster data may be compressed using compression board 90. The resolution may also be reduced to match the resolution of a computer monitor, which is much less than the resolution of a print engine 46. A preview image is generated from multiple color separations, and is sent in screen resolution to a preview client application.

The output manager 41 receives raster data from the RIP 34 and outputs the raster data to output device 46, thereby providing work flow and efficiency benefits. In addition, the output manager 41 is capable of manipulating raster data in a way that was not previously possible. Specifically, the output manager can combine color separations from the same or different images after the images have been processed by the raster image processor 34. This provides the user with the capability of modifying raster data after it has been processed by the RIP 34. For example, the output manager 41 includes operation as a digital image combiner, such as a digital doubleburner that combines two images onto the same plate. The output manager 41 also provides a masking operation as part of the digital image combiner for combining images to mask out part of an image, which is the electronic equivalent of deleting a section of imaged film. This is disclosed in co-pending U.S. application Ser. No. 09/089,861, which is incorporated herein by reference.

Representatives from a group of twenty-six manufacturers in the printing and prepress industry have collaborated with members of the Fraunhofer Institute for Computer Graphics to specify a production file format. Collectively, the group is referred to as International Cooperation for Integration of Prepress, Press, and Postpress ("CIP3"). The CIP3 Print Production Format ("ppf") describes data useful for printing and post-imaging processing of a job. The CIP3 specification does not describe the graphic language data that is used to generate high resolution graphic images, nor does it specify formats for the high resolution data. Rather, the CIP3 format describes a file format for storing post-imaging data useful, for example, for operation of a press.

Information contained in a ppf file can include, but is not limited to administration data, such as the name of an image creator, the date and time of creation, and the software that created the data; data for calculating ink consumption, such as transfer curves for copying data onto film, and transfer curves for copying data onto printing plate; folding data, which is a description of how a page should be folded; and content data, such as a low resolution continuous tone image, a description of position and type of registration marks, a description of measuring strips for color measuring fields and density measuring fields, and a description of cutting blocks.

Print Production Format data is stored in a file, referred to as a ppf file. The data in the ppf file can originate in a front end and be updated and adapted during the workflow from front end to RIP to output manager. In one embodiment, an output manager has the capability to generate ppf files for jobs. The output manager generates a ppf file for a job either automatically as part of the output process or upon manual command from a system operator. For an automated workflow, the output manager generates the ppf file using the settings of a press profile (described below) associated with the job. In one embodiment, the ppf files for an entire job are generated, regardless of which separations have been imaged. If the job is imaged multiple times with no modifications having been made to the job, the ppf file will only be generated the first time, so there is no redundant processing. If the job is modified, for example if the name has changed or if a separation is added, deleted, or modified, then the output manager regenerates the ppf file upon output. The system operator also can manually initiate generation of a ppf file through the user interface control for the output manager. Upon selection of a "Generate CIP3" menu item or activation of the CIP3 button in the toolbar, the output manager generates a ppf file for the job, if the job has a valid output device and press profile associated with it. If the job does not have a valid device or press profile, the user interface allows the system operator to provide that information.

One type of information that can be included in the ppf file is a reduced resolution continuous tone image, also referred to as a preview image. Press systems can use this image to configure the ink key settings on the press. These ink key settings determine the amount of ink that will be applied to a particular area of the press. For example, the press can determine from the reduced resolution continuous tone image that part of a cyan separation is blank and will require no cyan ink. The press can apply little or no cyan ink to that part of the press when that separation is printed. The ability to intelligently provide ink to the press only where the ink will be used saves costly ink and also allows the press to operate more efficiently. Different press systems have varying format requirements for the low resolution continuous tone image. These varying format requirements are within an interpretation of the CIP3 ppf specification. It is therefore useful for a prepress system to produce a CIP3 ppf file that is useful for the particular press on which an image will be printed.

Referring to FIG. 6, in one embodiment, an output manager uses a press profile 400 to generate a ppf file. The press profile 400 contains a configuration that includes characteristics of the output device and the press. A press profile 400 is associated with a job when the job is created at the front end, when the job is processed by the RIP, or by an output manager. Each press profile 400 has a unique name or identifier 401 that is entered by the user when configuring the press profile 400. This press profile identifier 401 appears in the output manager user interface application when the system operator selects a press profile to be associated with a job. The user can specify a file location 402, which is a local or remote destination for the ppf files. The destination specified by file location 402 may be a directory that is directly accessible by a press, or it may be a location from which the press operator can get the file and transfer it to the press.

The press profile 400 also includes ppf file naming information 403. The ppf file naming information is used to name the ppf file. Different ppf file consumers, such as CIP3 consumer applications, may expect the ppf file to be named in a particular manner. In one embodiment, the ppf file naming information 403 includes a file name extension. The file name extension describes the last few letters of the file name that will be assigned to ppf files. The default file extension 403 is ".ppf". In one embodiment, the file naming information 403 will include a naming template for the file name which will allow the system operator to configure the format of the file name.

As described above, a job can include one or more sheets, each sheet can have one or two sides, and each side can include one or more separations. A CIP3 consumer application may expect the file name to provide information about the image described by the ppf file. As an example, the ppf file name may be required to indicate the job, the sheet, the side, and the separation described in the ppf file. For example, the ppf file name may need to indicate that the ppf file contains information about the cyan separation of the front side of sheet 5 of job 1024.

In one embodiment that uses a naming template, the template for the file name takes the form "%J%X%I%N%X%S%X%C.%EXT", where %J is the job name, %I is the job identifier, %N is the sheet number, %S is the sheet side, %C is the separation color, %X is one or more separator characters, and %EXT is the file name extension. The system operator provides text definitions for text replacement variables such as the separator character (e.g. a "-" for a separator character), and defines text to represent the elements that have choices. (e.g. "Front" and "Back" for the sheet side variable). As a specific example, using the template above, the separator character %X is defined as an underline ("_"), the %S sheet side defined as "A" for front and "B" for back, and the file name extension %EXT is defined as cip. If a job is named "myjob", the job identifier is #1024, the job has one sheet, two sides, with cyan and magenta separations on each side, and the preference is to have one ppf file for each separation, then the following files will be generated: "myJob_1024_1_A_Cyan.cip", "myJob_1024_1$_{13}$ A_Majenta.cip", "myJob_1024_1_B_Cyan.cip", "myjob_1024_1_B Majenta.cip".

The next four items in the press profile 400 relate to the preview image. The orientation 404 identifies the transformation(s) necessary for the output manager system to orient the preview image so that it can be properly interpreted and displayed by the CIP3 consumer application. The preview image is a reduced resolution copy of the raster image processed high-resolution image. The orientation of the preview image depends on the orientation of the high-resolution image, which depends on the configuration of the RIP, the destination imagesetter, and the press. Generally, CIP3 consumer applications that display the preview image want the preview image oriented so that the gripper edge is in a particular place, for example at the bottom of the preview image. This may require a transformation such as a rotation by 90°, 180°, or 270°, and/or an inversion operation.

Generally, for a particular output device/press combination, one particular transformation is appropriate. That orientation choice is stored in the press profile orientation 404.

Figure 7A:
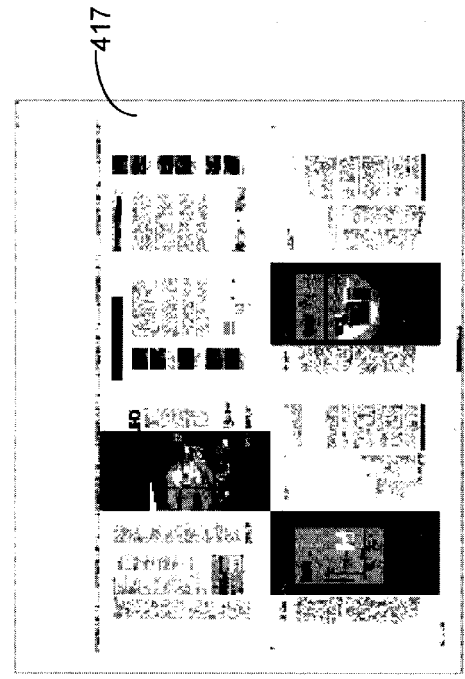
FIGS. 7A, 7B, 7C, and 7D are an example of an orientation modification specified by the press profile of FIG. 6.
Figure 7B:
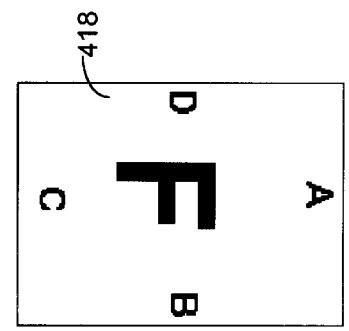

Referring to FIG. 7A, in an example separation 415, the gripper edge is located on the top of the image 414. This orientation is shown in FIG. 7B as the first direction graphic 416.

Figure 7C:
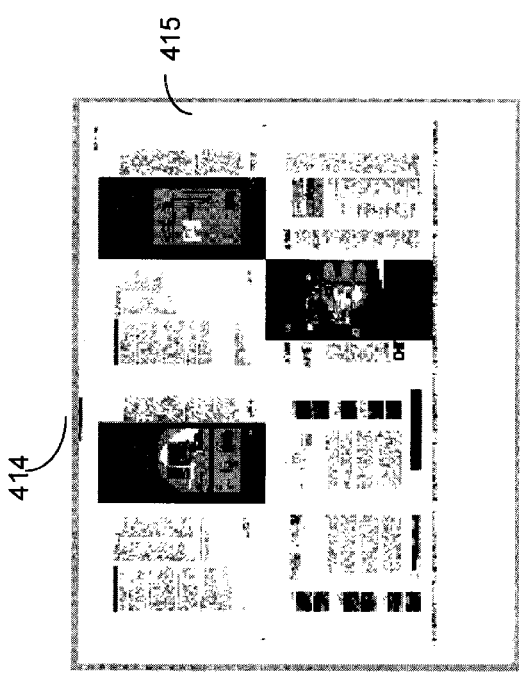
Figure 7D:
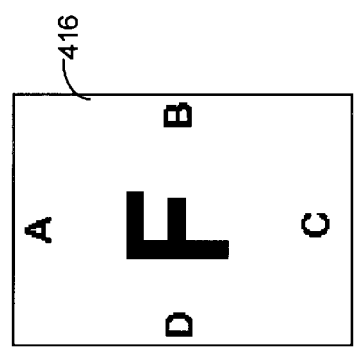

A CIP3 consumer application will expect the gripper edge to be at the bottom, oriented as shown in FIG. 7C as the rotated separation 417. The transformation, as shown in FIG. 7D, is the transformation from the first direction graphic 416 to the second direction graphic 418. The transformation in this example is a 180° rotation.

Referring again to FIG. 6, the resolution 405 describes the resolution expected by the CIP3 consumer application. A resolution suggested by the CIP3 specification is two lines per millimeter, which is equivalent to 50.8 dots-per-inch. Images generated at an integer resolution, for example 50 dpi, may need to be converted depending on the particular CIP3 consumer application requirements. It should be noted that the CIP3 specification also suggests that an image be imaged by a RIP at a resolution of at least 300 dpi and then filtered, with anti-aliasing, to 50.8 dpi. This minimum resolution requirement is met if the preview is generated by the RIP as the RIP processes a high-resolution image.

The encoding 406 and compression 407 indicate the encoding and compression, respectively, expected by the CIP3 consumer application. The CIP3 specification allows for encoding and image compression as described in the PostScript Language Reference Manual. Examples of types of encoding include, but are not limited to, binary, ASCII hexidecimal, and ASCII base-85 encoding. Examples of types of compression include, but are not limited to, no compression, run length compression, CCITT fax compression, and discrete cosine transform ("DCT") compression.

The ppf file format 408 describes the format of the file, for example the number of sheets and/or separations that are included in one ppf file. Examples of types of formats include, but are not limited to, multiple sheets supported in one file, a single sheet for each PPF file, a single sheet side for each PPF file, and a single separation for each ppf file.

The press profile 400 can also include the bend position 409, which refers to the location on the plate where the plate is bent to fit into the head clamp on a press. The bend position can be explicitly included in the front end image by imposition software. The bend area (the area between the bend position and the gripper edge) is included as part of the image when the image is constructed in the imposition application. The bend position is not usually represented by markings in the image. By including the bend position in the press profile, the output manager can mark the location of the bend position on a proof image, making the proof image more useful to verify the imposition and layout of job, including the bend position. The press profile can also include the byte alignment 410 of the preview image, that is, for example, whether a scanline ends on a one-byte, two-byte, or four-byte boundary.

The press profile 400 can also include the second side configuration 411, which indicates how the press should print on the second side of a sheet. The second side configuration can indicate one of sheetwise, perfecting, work and turn, or work and tumble. Sheetwise printing uses two printing plates, one for each side of the sheet with a common gripper edge used for printing both sides. Perfecting is printing two sides of a sheet using two printing plates, with an opposite gripper edge used for the front and back sides of the sheet. Work and turn printing uses the same printing plate for front and back, with a common gripper edge used for both sides of the paper. Work and tumble also uses the same printing plate for front and back, but with the opposite gripper edge used for the front and back sides.

An output manager can use the second side configuration 411 to manage the output for a specific output device. For example, to proof sheetwise or work and turn jobs (which have a common gripper edge) on a particular duplex proofer that accepts sheet fed media, such as the Barco Impress, available from Barco Graphics of South Windsor, Connecticut, the back sides of the jobs must be rotated by 180° to align the front and back sides properly. For perfecting or work and tumble jobs (which use the opposite gripper edge for each side), the back sides must not be rotated. If the second side configuration information is included in the press profile, the output manager can accommodate the proofer.

The press profile 400 can also include job naming and identifier information 412. A ppf file includes a job name and a job identifier. A system operator may want the job name and/or the identifier to be in a particular format, for example, to include a customer number, or a work order number assigned when a job is ordered by a customer. Such a customer number or work order number may be unrelated to the output manager identifier, or the identifier assigned to a job by the RIP.

In one embodiment, the job information 412 includes executable code, or a reference to executable code, such as the name of dynamically linked library (e.g. a .dll file reference), that will determine or query the system operator or another computer system for the necessary job name and/or identifier information. For example, one such executable code determines some or all of the job identifier by querying the user, and using that information, possibly with additional information, such as the name assigned at the front end, or a number (e.g. "myjob" or "myJob_#222"). Another embodiment of such executable code performs a lookup from a networked database, such as the print shop order database, to determine the job name and/or identifier. Another such executable code uses the job identifier assigned by the RIP, or the job identifier assigned by the output manager. Another such executable code uses the job identifier assigned by the RIP, or the job identifier assigned by the output manager, in combination with other information.

Figure 8B:
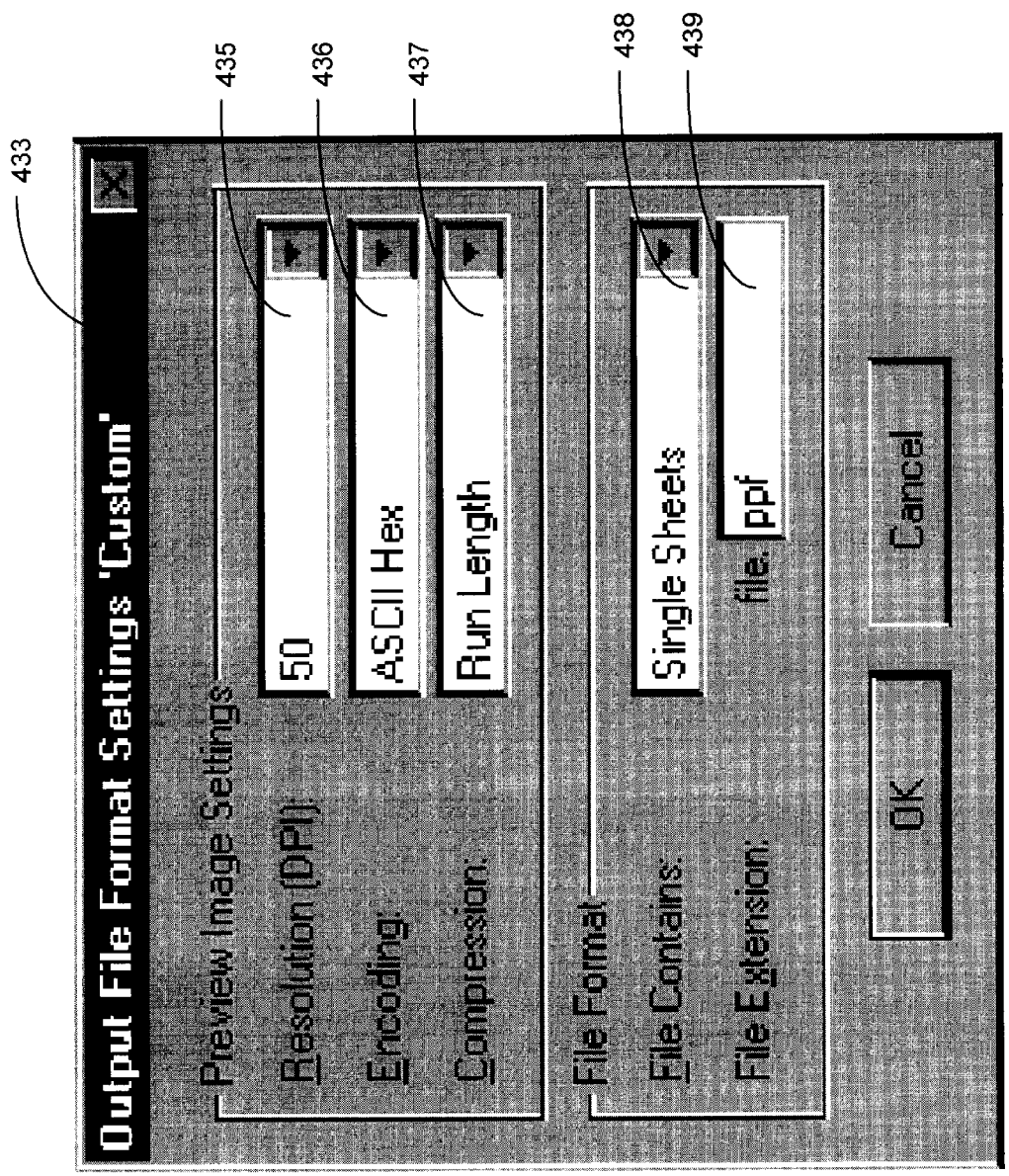

Referring to FIGS. 8A and 8B, a user interface tool is used to configure a press profile. The press profile identifier in this example is identified as "press 1024". The configuration screen 430 allows configuration of the CIP3 output file format. The file format has an associated identifier 431, which in this example is shown as "custom." The settings button 432 activates a settings window 433. The settings window 433 provides for identification of resolution 435, encoding 436, compression 437, file format 438, and a file extension 439. The configuration screen also provides for configuring an output location 440, and an orientation 441.

Figure 9:
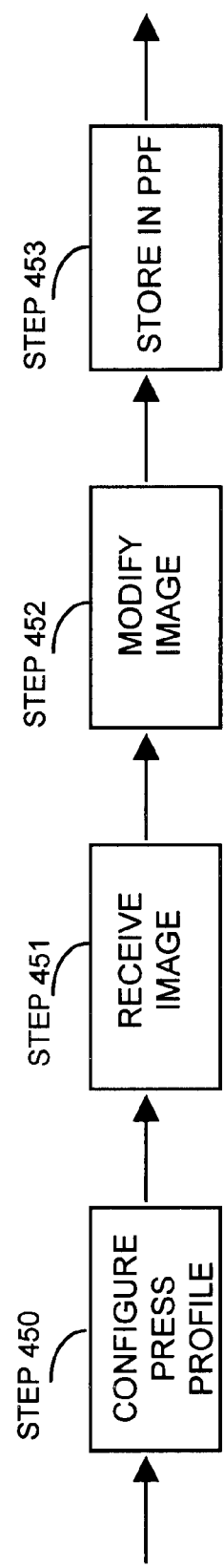
FIG. 9 is an embodiment of a flowchart of the operation of an output manager using the press profile.

Referring to FIG. 9, a press profile is configured (STEP 450). In one embodiment, the press profile is specified as part of the system configuration by use of a user interface tool as described above. A press profile generally can be configured once for a particular output device/press combination. A specific press profile may be used by a number of imagesetter models. For example, all of the Agfa Avantra line of imagesetters would likely use the same press profile.

Also, a press profile can be configured to use the default output device orientation, which is the orientation for each imagesetter/platesetter that results in the gripper edge being presented at the bottom of the preview image. If the default orientation is adequate for all imagesetters, only one press profile may be necessary for all output devices.

The press profile is associated with a job either by the system operator at the front end, or at the RIP when the job is output for a particular imagesetter. After a job is imaged, the output manager receives a high resolution image and a low resolution image. (STEP 451). In one embodiment, the low resolution image is generated when the RIP has the high resolution image in memory, which makes the generation of the low resolution image relatively fast. The high resolution image is stored in the output manager in the usual manner for queuing to an output device, or for modification. If the high resolution image is modified on the output manager, for example to correct or modify a separation, or to combine two separations, the low resolution image is modified accordingly, so that the low resolution image is an accurate representation of the high resolution image. In addition, the low resolution image is modified as necessary, according to the selected press profile (STEP 452). The modified image is inserted into a ppf file (STEP 453) along with any other relevant information. The ppf file is stored in the format, location, and with the file name extension indicated in the press profile.

Figure 10:
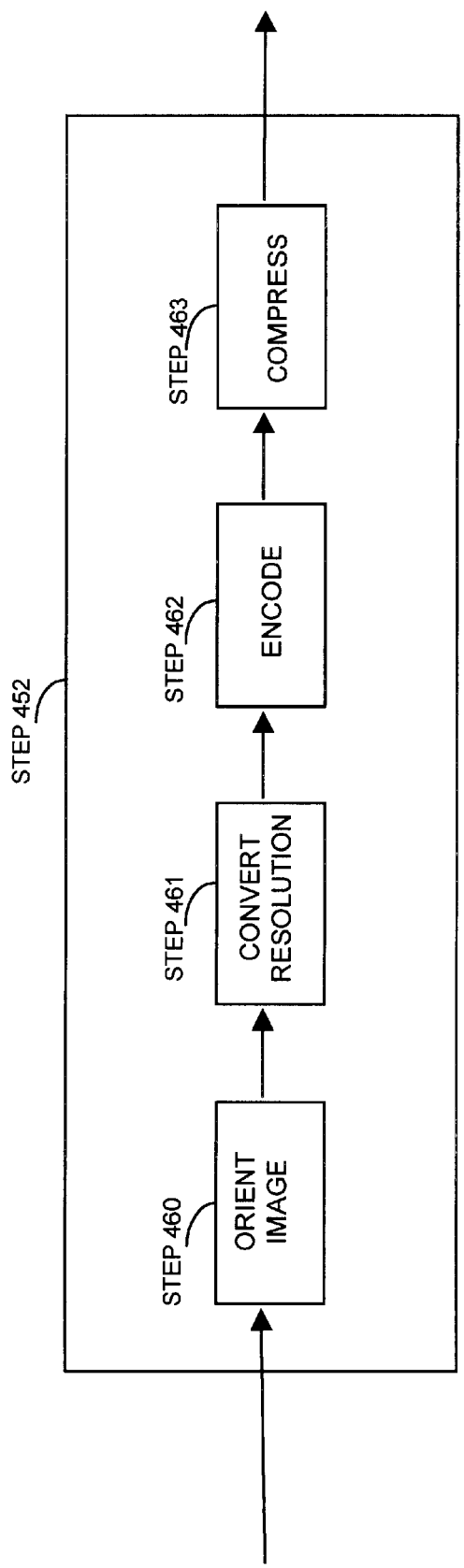
FIG. 10 is an embodiment of the modification step of FIG. 9.

Referring to FIG. 10, the modification of the low resolution image (STEP 452) includes orienting the image (STEP 460) according the orientation indicated by the press profile. Generally, this is accomplished by an orientation transformation as described above. The output manager converts the resolution of the image (STEP 461). For example, a press, or some other CIP3 consumer application, may expect a particular resolution, such as the 50.8 dpi resolution specified in the CIP3 specification. This conversion can be accomplished by filtering with anti-aliasing, and by such other algorithms for converting resolution as are known in the art. The output manager encodes the image (STEP 462) and compresses the image (STEP 463) as expected by the CIP3 consumer application and indicated in the press profile. If the compression is specified as "none," no compression will take place.

It is to be understood that the above described embodiments are merely illustrative of the present invention and represent a limited number of the specific embodiments that can provide applications of the principles of the invention. Numerous and varied other arrangements may be readily devised in accordance with these principles by those skilled in the art without departing from the spirit and scope of the invention as claimed.

What is claimed is:

1. A method for including a reduced resolution continuous tone image in a print production format file, comprising the steps of:
   defining an output device;
   defining a press;
   configuring a press profile in response to the output device and the press;
   receiving a reduced resolution image;
   modifying the reduced resolution image responsive to the press profile; and
   storing the modified reduced resolution image in a print production file.

2. The method of claim 1 wherein the print product file is in CIP3 format.

3. The method of claim 1 wherein the modifying step comprises converting the reduced resolution image to another resolution responsive to the press profile.

4. The method of claim 1 wherein the modifying step comprises encoding the reduced resolution image responsive to the press profile.

5. The method of claim 1 wherein the modifying step comprises compressing the reduced resolution image responsive to the press profile.

6. The method of claim 1 wherein the image receiving step comprises receiving by an output manager a high resolution image generated from an original continuous tone image and the reduced resolution image generated from the high resolution image.

7. The method of claim 6 wherein the reduced resolution image is generated when the high resolution image is stored in memory.

8. The method of claim 6 further comprising the step of modifying the reduced resolution image responsive to modifications to the high resolution image.

9. The method of claim 1 wherein the method further includes providing the stored print production file to a CIP3 consumer application.

10. The method of claim 1 wherein the press profile comprises a press profile name, an orientation, a resolution, a file name extension, a compression setting, an encoding setting, and a print production file format.

11. The method of claim 1 wherein the press profile is configured for an imagesetter/press combination.

12. The method of claim 6 wherein the high resolution image and the reduced resolution image are generated by a raster image processor while the original continuous tone image is processed by the raster image processor.

13. A system for including a reduced resolution continuous tone image in a print production format file, comprising:
   an input for configuring a press profile;
   a receiver for receiving a reduced resolution image;
   a processor for modifying the reduced resolution image responsive to the press profile; and
   a data store for storing the modified reduced resolution image in a print production file.

14. The system of claim 13 wherein the print production file is in CIP3 format.

15. The system of claim 13 wherein the processor comprises a converter for converting the reduced resolution image to another resolution responsive to the press profile.

16. The system of claim 13 wherein the processor comprises an encoder for encoding the reduced resolution image responsive to the press profile.

17. The system of claim 13 wherein the processor comprises a compressor for compressing the reduced resolution image responsive to the press profile.

18. The system of claim 13 wherein the system is an output manager.

19. The system of claim 13 wherein the system further includes a transmitter for providing the print production file to a CIP3 consumer application.

20. The system of claim 13 wherein the press profile comprises a press profile name, an orientation, a resolution, a file name extension, a compression setting, an encoding setting, and a print production file format.

21. The system of claim 13 wherein the press profile is configured for an imagesetter/press combination.

22. The system of claim 13 wherein a high resolution image generated from an original continuous tone image and the reduced resolution image generated from the high resolution image are generated by a raster image processor when the original continuous tone image is processed by the raster image processor.

23. The system of claim 22 wherein the reduced resolution image is generated when the high resolution image is stored in memory.

24. The method of claim 22 further comprising a modifiier for modifying the reduced resolution image responsive to modifications to the high resolution image.

25. A system comprising:
a memory comprising a press profile, the press profile comprising a file location, an orientation, a resolution, a file name extension, a compression type, an encoding type, and a print production file format.

26. The press profile of claim 25, further comprising one or more of the following parameters: a bend position, a second side configuration, and an image byte alignment.

* * * * *